United States Patent [19]

Kashima

[11] Patent Number: 5,314,516
[45] Date of Patent: May 24, 1994

[54] SEALING DEVICE FOR FILTERS

[75] Inventor: Masakazu Kashima, Tokyo, Japan

[73] Assignee: Taikisha, Ltd., Tokyo, Japan

[21] Appl. No.: 145,096

[22] Filed: Nov. 3, 1993

[51] Int. Cl.⁵ .............................. B01D 46/10
[52] U.S. Cl. .................... 55/484; 55/385.2;
    55/502; 55/DIG. 31; 454/187
[58] Field of Search ............ 55/355, 473, 483, 484,
    55/490, 493, 502, 385.2, DIG. 31; 454/187

[56] References Cited

U.S. PATENT DOCUMENTS 3,880,625  4/1975  Shook ........................ 55/502 X Primary Examiner—Charles Hart
Attorney, Agent, or Firm—Armstrong, Westerman, Hattori, McLeland & Naughton

[57] ABSTRACT

A device for sealing a clearance between a ceiling frame and a filter frame placed on the ceiling frame. The ceiling frame includes closed tubes and has an upper wall formed with holes for holding the interior of the ceiling frame in communication with a groove formed in the bottom face of the filter frame. The interior of the ceiling frame is given a negative pressure by suction.

2 Claims, 3 Drawing Sheets

SEALING DEVICE FOR FILTERS

BACKGROUND OF THE INVENTION

The present invention relates to a filter sealing device for sealing a clearance between a ceiling frame and filter frames placed thereon for use in clean rooms, for example, of semiconductor manufacturing plants, pharmaceutical plants and hospitals, biologically clean rooms, etc., and more particularly to a sealing device suitable for superhigh efficiency filters such as HEPA filters and ULPA filters.

The ceiling portion of such a clean room has a ceiling frame which comprises horizontal beams arranged lengthwise and crosswise and defining openings therebetween, and a plurality of filters arragned on the ceiling frame for the respective openings. Super-high efficiency filters such as those mentioned above are often used for clean rooms of higher grade.

While the filter is fixed to the ceiling frame by a filter frame placed thereon, it is necessary to prevent leakage of air through a clearance between the frames. Especially in the case of superhigh efficiency filters which offer great resistance and produce a great pressure difference, a great air leak will occur unless the clearance is sealed off reliably.

To preclude such leakage of air from between the ceiling frame and the filter, a sealing material is conventionally provided between the upper face of the ceiling frame and the lower edge of the filter frame as disclosed, for example, in Examined Japanese Utility Model Publication No. 31130/1990.

The sealing material is applied in situ, therefore requires labor and is likely to permit an air leak if applied improperly to result in impaired filtration. Moreover, the sealing material is likely to release a solvent gas and harden during use, failing to serve the desired sealing function.

Further when there arises a need to remove the filter from the ceiling frame during use for cleaning or replacement, the sealing material must be cut off by a troublesome procedure, and the cumbersome work need to be repeated again for the installation of filter.

Another problem is also encountered in that air is liable to leak from the beam joints of the ceiling frame.

SUMMARY OF THE INVENTION

The main object of the present invention is to overcome the foregoing problems and to provide a sealing device for filters which achieves a high sealing effect and which nevertheless readily permits installation and removal of the filter.

The present invention provides a filter sealing device for sealing a clearance between a ceiling frame and a filter frame placed on the ceiling frame, the sealing device being characterized in that the ceiling frame is in the form of a closed tube, the filter frame having a lower face formed with a groove, the ceiling frame having an upper wall formed with holes for holding the interior of the ceiling frame in communication with the groove of the filter frame, the interior of the ceiling frame being given a negative pressure by suction.

For example, the ceiling frame comprises horizontal beams each in the form of a closed tube of square to rectangular cross section and arranged lengthwise and crosswise in the form of a lattice to define a plurality of square to rectangular openings therebetween, the beams being joined together to internally communicate with one another, each of the openings being provided with a filter and covered therewith, the filter frame being in the form of a vertical short tube of square to rectangular cross section and provided for the filter, the filter frame being placed on and fixed to upper walls of the beams defining the opening, the groove being formed in the lower face of the filter frame and extending over the entire periphery thereof, the holes being formed in the beam upper walls for holding the interior of the beams in communication with the groove in the filter frame.

The interior of the ceiling frame has a negative pressure, which is therefore imparted to the inside of the groove in the filter frame through the holes in the upper wall of the ceiling frame, with the result that air leaking from one side of the filter frame is invariably caused to flow into the groove and drawn into the ceiling frame through the hole in its upper wall. Accordingly, the air will not flow from one side of the filter frame to the other side thereof. This prevents dust or the like to flow from one side of the filter frame to the other side thereof, providing a reliable seal between the ceiling frame and the filter frame. Even if the joint of the ceiling frame has an interstice, the air on one side of the ceiling frame will not flow to the other side thereof but is drawn into the ceiling frame having negative pressure. Thus, the portion of interstice can also be sealed off reliably.

When the filter is to be installed, the grooved portion of the filter frame needs only to be placed on the upper wall of the ceiling frame in alignment with the holes therein, and no other sealing work is necessary. The filter is removable merely by lifting the filter frame off the ceiling frame.

With the sealing device of the present invention, the clearance between the ceiling frame and the filter frame can be sealed reliably without using any sealing material, while even if joints of the ceiling frame have interstices, the portion of interstice can be sealed off reliably.

Since there is no need to use a sealing material, sealing work or seal cutting-off work can be dispensed with. This facilitates installation and removal of the filter, eliminating the likelihood that the function of the filter will be impaired owing to faulty work permitting air leakage and further obviating the likelihood of the seal failing to function properly owing to a solvent gas released from the sealing material or to the hardening of the sealing material during use.

DESCRIPTION OF THE PREFERRED EMBODIMENT

An embodiment of the invention will be described below with reference to the drawings.

Figure 1:
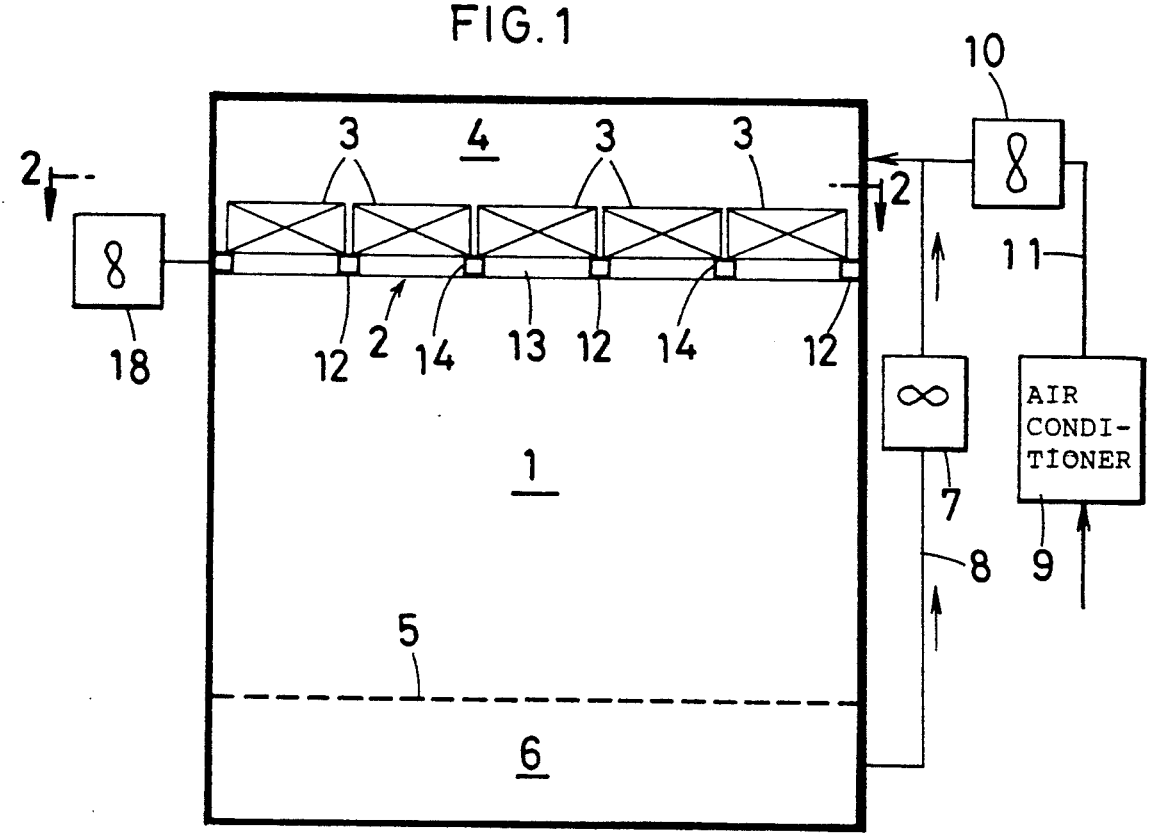
FIG. 1 is a view in vertical section of a clean room to show an embodiment of the invention.

FIG. 1 schematically shows a clean room 1 and air cleaning equipment therefor.

The clean room 1 has a ceiling portion provided with a ceiling frame 2, on which a plurality of superhigh efficiency filters 3 are mounted. The space above the filters serves as an air supply chamber 4. provided inside the clean room 1 is a floor 5 which is made of perforated plate. The space under the floor serves as an exhaust chamber 6.

An air return passageway 8 having an air return fan 7 is provided between the exhaust chamber 6 and the supply chamber 4. Disposed outside the supply chamber 4 is a fresh air introduction channel 11 having an air conditioner 9 and a supply fan 10.

The return fan 7 recycles air through a recycling channel comprising the supply chamber 4, clean room 1, exhaust chamber 6 and return passageway 8. Stated more specifically, the air within the exhaust chamber 6 is forced through the lower portion of the return passageway 8 into the return fan 7 and passed through the upper portion of the passageway 8 into the supply chamber 4. The air admitted into the chamber 4 is supplied to the clean room 1 through the filters 3, which clean the air. The air within the clean room 1 enters the exhaust chamber 6 through the floor 5 and is recycled in the same manner as above. When required, fresh outside air flowing through the air conditioner 9 is supplied to the chamber 4 by the supply fan 10.

Figure 2:
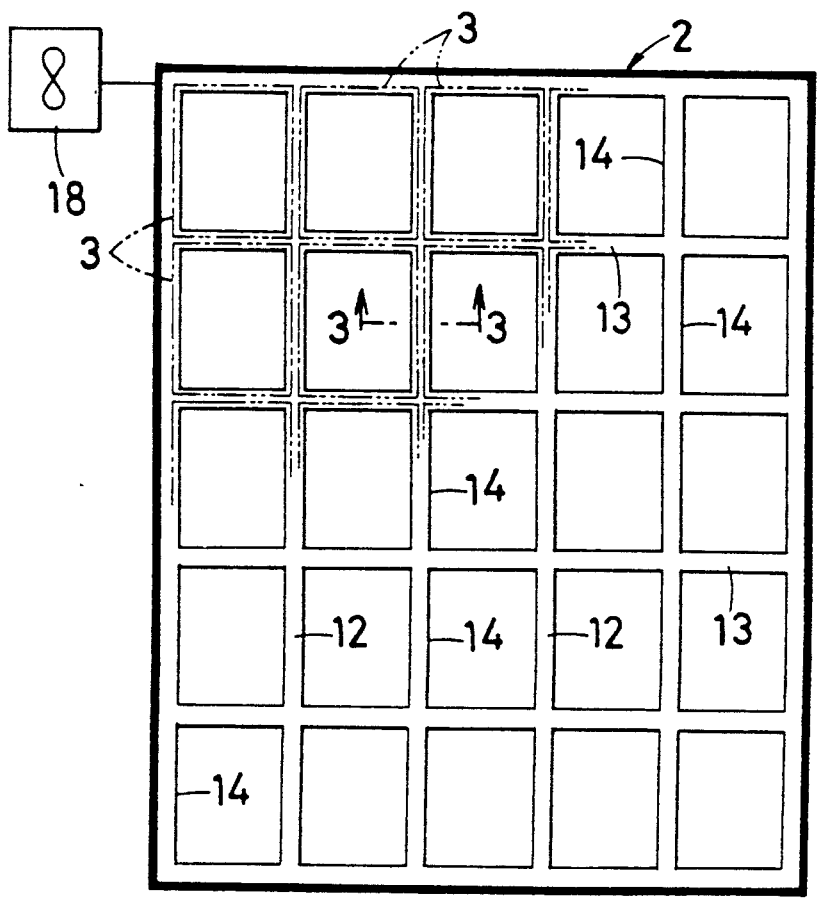
FIG. 2 is a plan view (view in section taken along the line 2—2 in FIG. 1) of a ceiling frame.
Figure 3:
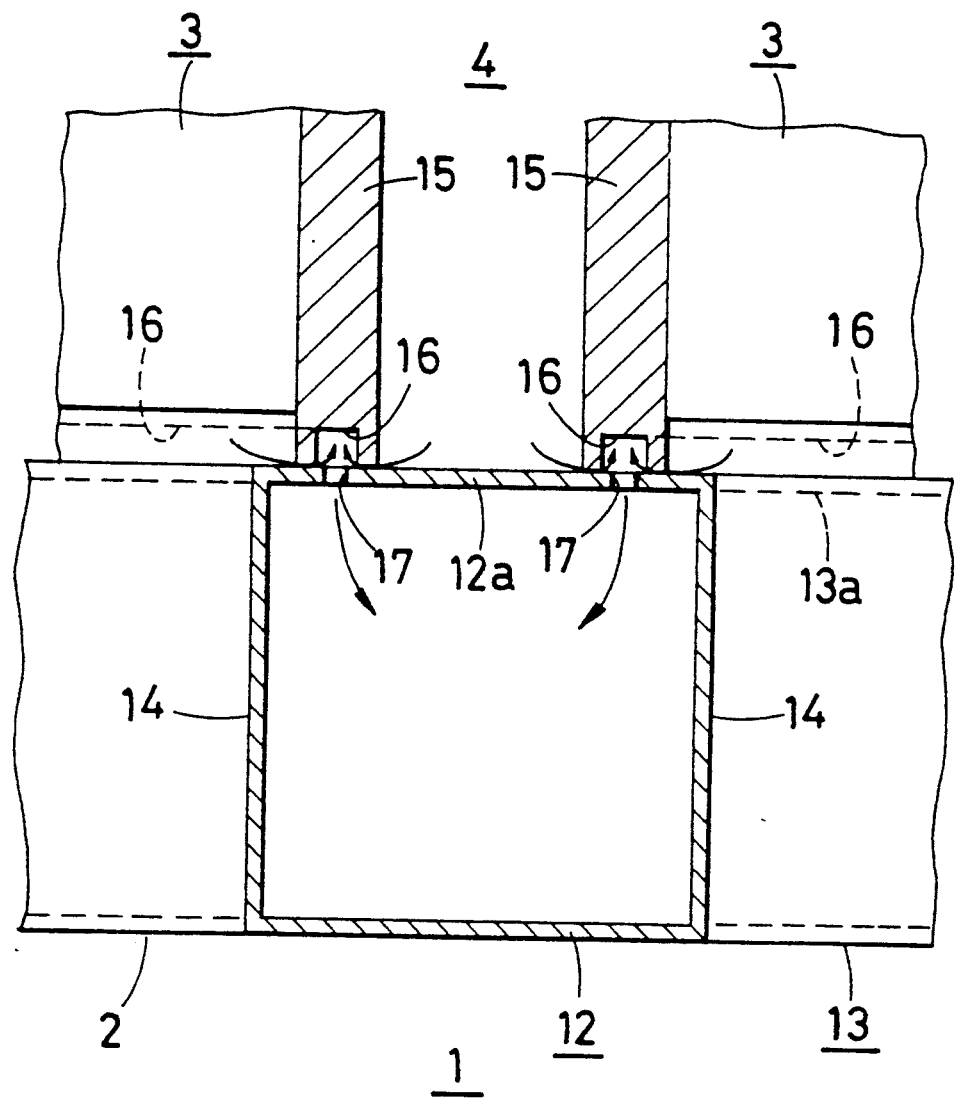
FIG. 3 is a view in vertical section (enlarged view in section taken along the line 3—3 in FIG. 2) showing the embodiment, i.e., device for sealing a clearance between the ceiling frame and filters on an enlarged scale.

FIG. 2 is a plan view of the ceiling frame 2, and FIG. 3 is an enlarged view in vertical section showing a device for sealing a clearance between the ceiling frame 2 and the filters 3.

The ceiling frame 2 comprises horizontal beams 12, 13 arranged lengthwise and crosswise in the form of a lattice and defining rectangular openings 14 therebetween. The filters 3 are mounted on the beams 12, 13 and arranged over the respective openings 14 to close the openings. Although not shown, the ceiling frame 2 is suspended from structural members of the ceiling portion by suspension bolts.

The beams 12, 13 of the ceiling frame 2 are each in the form of a closed tube of square to rectangular cross section and joined together so as to internally communicate with one another.

Each of the filters 3 is provided with a filter frame 15 in the form of a vertical short tube of square to rectangular cross section, placed on the upper walls 12a, 13a of the beams 12, 13 defining the opening 14 and fixed to the walls by suitable means. The the filter frame 15 is pressed over the entire periphery of its bottom against upper face portions, close to the opening 14, of the upper walls 12a, 13a of the beams 12, 13.

A groove 16 of rectangular cross section is formed on the bottom face of the filter frame 15 over the entire periphery thereof. The upper walls 12a, 13a of the beams 12, 13 are formed with a multiplicity of relatively small holes 17 for holding the interior of the beams 12, 13 in communication with the groove 16 in the filter frame 15.

A suction fan 18 is connected to a suitable portion of the ceiling frame 2 for withdrawing air from inside the ceiling frame 2 to the outside.

When operated, the suction fan 18 gives the interior of the ceiling frame 2 a negative pressure, which is imparted to the interior of the groove 16 in each filter frame 15 through the holes 17 in the upper walls 12a, 13a of the beams 12, 13. Accordingly, air leaking from the supply chamber side of the filter frame 15 invariably flows into the groove 16 of the filter frame 15 and is drawn into the ceiling frame 2 through the holes 17 in the upper walls 12a, 13a. Accordingly, the air will not flow from the supply chamber side of the filter frame 15 to the clean room side thereof. This prevents dust or the like to flow toward the clean room side, providing a reliable seal between the ceiling frame 2 and the filter frame 15. Even if the joint of the ceiling frame 2 has an interstice, the air on one side of the ceiling frame 2 will not flow to the other side thereof but is drawn into the ceiling frame 2 having negative pressure. Thus, the portion of interstice can also be sealed off reliably.

What is claimed is:

1. A filter sealing device for sealing a clearance between a ceiling frame and a filter frame placed on the ceiling frame, the sealing device including the ceiling frame is in the form of a closed tube, the filter frame having a lower face formed with a groove, the ceiling frame having an upper wall formed with holes for holding the interior of the ceiling frame in communication with the groove of the filter frame, the interior of the ceiling frame being given a negative pressure by suction.

2. A filter sealing device as defined in claim 1 wherein the ceiling frame comprises horizontal beams each in the form of a closed tube of square to rectangular cross section and arranged lengthwise and crosswise in the form of a lattice to define a plurality of square to rectangular openings therebetween, the beams being joined together to internally communicate with one another, each of the openings being provided with a filter and covered therewith, the filter frame being in the form of a vertical short tube of square to rectangular cross section and provided for the filter, the filter frame being placed on and fixed to upper walls of the beams defining the opening, the groove being formed in the lower face of the filter frame and extending over the entire periphery thereof, the holes being formed in the beam upper walls for holding the interior of the beams in communication with the groove in the filter frame.

* * * * *